United States Patent
Xu et al.

(10) Patent No.: US 11,089,555 B2
(45) Date of Patent: Aug. 10, 2021

(54) DYNAMIC CONFIGURATION OF OPERATION POWER PARAMETERS

(71) Applicant: QUALCOMM Incorporated, San Diego, CA (US)

(72) Inventors: Huilin Xu, San Diego, CA (US); Peter Pui Lok Ang, San Diego, CA (US); Wanshi Chen, San Diego, CA (US); Joseph Binamira Soriaga, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/725,254

(22) Filed: Dec. 23, 2019

(65) Prior Publication Data

US 2020/0221390 A1    Jul. 9, 2020

Related U.S. Application Data

(60) Provisional application No. 62/789,304, filed on Jan. 7, 2019.

(51) Int. Cl.
*H04W 52/28* (2009.01)
*H04W 52/02* (2009.01)
*H04W 52/14* (2009.01)

(52) U.S. Cl.
CPC ....... *H04W 52/28* (2013.01); *H04W 52/0235* (2013.01); *H04W 52/143* (2013.01)

(58) Field of Classification Search
CPC .............. H04W 52/0212–0248; H04W 72/042
See application file for complete search history.

(56) References Cited

U.S. PATENT DOCUMENTS

| | | | |
|---|---|---|---|
| 8,625,703 B2 * | 1/2014 | Ko ........................ | H04B 7/0452 375/284 |
| 10,361,831 B2 * | 7/2019 | Froberg Olsson .... | H04L 5/0053 |

(Continued)

OTHER PUBLICATIONS

Catt: "Study on UE Power Saving in NR", 3GPP Draft, 3GPP TSG RAN meeting #82, RP-182355 SR on UE Power Saving, 3rd Generation Partnership Project (3GPP), Mobile Competence Centre, 650, Route Des Lucioles, F-06921 Sophia-Antipolis Cedex, France, vol. TSG RAN, No. Sorrento, Italy, Dec. 10, 2018-Dec. 13, 2010, Dec. 9, 2018 (Dec. 9, 2018), XP051552533, pp. 1-23, Retrieved from the Internet: URL: http://www.3gpp.org/ftp/Meetings%5F3GPP%5FSYNC/RAN/Docs/RP%2D182355%2Ezip, [retrieved on Dec. 9, 2018], the whole document.

(Continued)

*Primary Examiner* — Jinsong Hu
*Assistant Examiner* — Rui M Hu
(74) *Attorney, Agent, or Firm* — Harrity & Harrity, LLP

(57) ABSTRACT

Some techniques and apparatuses described herein permit a user equipment (UE) to transition among different power configurations, which include different values for different power parameters, that impact an amount of power consumed by the UE. In some aspects, these transitions may be signaled by a base station based at least in part on traffic volume for the UE, which may assist with improving throughput and/or extending battery life of the UE. Furthermore, these transitions may be signaled dynamically, such as in downlink control information (DCI) and/or a medium access control (MAC) control element (CE) MAC-CE, which may conserve battery power and/or network resources as compared to reconfiguring the UE using an RRC message, and which may allow the UE to be reconfigured quickly as conditions associated with the UE change.

30 Claims, 10 Drawing Sheets

(56) References Cited

U.S. PATENT DOCUMENTS

| | | | | |
|---|---|---|---|---|
| 10,602,453 | B2* | 3/2020 | Fakoorian | H04L 25/0228 |
| 2009/0137260 | A1* | 5/2009 | Son | H04W 52/0235 |
| | | | | 455/466 |
| 2009/0233653 | A1* | 9/2009 | Kim | H04W 52/04 |
| | | | | 455/574 |
| 2011/0009136 | A1* | 1/2011 | Mantravadi | H04W 88/06 |
| | | | | 455/501 |
| 2012/0140743 | A1* | 6/2012 | Pelletier | H04W 76/28 |
| | | | | 370/335 |
| 2012/0201182 | A1* | 8/2012 | Kwon | H04W 52/0225 |
| | | | | 370/311 |
| 2012/0252423 | A1* | 10/2012 | Brisebois | H04W 24/02 |
| | | | | 455/418 |
| 2012/0264441 | A1* | 10/2012 | Chandrasekhar | H04L 5/0073 |
| | | | | 455/450 |
| 2013/0034073 | A1* | 2/2013 | Aiba | H04L 1/1887 |
| | | | | 370/329 |
| 2013/0318380 | A1* | 11/2013 | Behrens | H04L 12/12 |
| | | | | 713/323 |
| 2014/0105164 | A1* | 4/2014 | Moulsley | H04W 72/1289 |
| | | | | 370/329 |
| 2014/0177500 | A1* | 6/2014 | Han | H04W 52/0206 |
| | | | | 370/311 |
| 2014/0226582 | A1* | 8/2014 | Zeng | H04B 7/0626 |
| | | | | 370/329 |
| 2015/0029918 | A1* | 1/2015 | Bangolae | H04L 5/14 |
| | | | | 370/311 |
| 2015/0071188 | A1* | 3/2015 | Nammi | H04W 72/0406 |
| | | | | 370/329 |
| 2015/0163745 | A1* | 6/2015 | Kim | H04W 76/28 |
| | | | | 370/311 |
| 2015/0365893 | A1* | 12/2015 | Nobusawa | H04W 52/0235 |
| | | | | 455/574 |
| 2017/0208588 | A1* | 7/2017 | Park | H04L 27/2656 |
| 2017/0332359 | A1* | 11/2017 | Tsai | H04B 7/0639 |
| 2018/0041906 | A1* | 2/2018 | Jang | H04W 24/10 |
| 2018/0146433 | A1* | 5/2018 | Zhang | H04W 52/146 |
| 2018/0206246 | A1* | 7/2018 | Zhang | H04W 72/085 |
| 2018/0227893 | A1* | 8/2018 | Park | H04L 5/0035 |
| 2018/0254814 | A1* | 9/2018 | Park | H04B 7/0626 |
| 2018/0332541 | A1* | 11/2018 | Liu | H04W 52/242 |
| 2019/0059051 | A1* | 2/2019 | Åström | H04W 88/06 |
| 2019/0104506 | A1* | 4/2019 | Wang | H04W 72/042 |
| 2019/0116552 | A1* | 4/2019 | Sebeni | H04W 76/28 |
| 2019/0200378 | A1* | 6/2019 | Ko | H04W 72/042 |
| 2019/0261362 | A1* | 8/2019 | Chen | H04W 48/12 |
| 2019/0305837 | A1* | 10/2019 | Onggosanusi | H04W 88/08 |
| 2019/0335400 | A1* | 10/2019 | Gong | H04W 52/18 |
| 2019/0357224 | A1* | 11/2019 | Li | H04W 72/04 |
| 2019/0373588 | A1* | 12/2019 | Bae | H04L 1/1822 |
| 2019/0380125 | A1* | 12/2019 | Yamamoto | H04L 5/0055 |
| 2020/0014493 | A1* | 1/2020 | Shao | H04L 1/189 |
| 2020/0022138 | A1* | 1/2020 | Cheng | H04W 72/0413 |
| 2020/0029315 | A1* | 1/2020 | Lin | H04L 5/0051 |
| 2020/0037247 | A1* | 1/2020 | Liao | H04W 72/0453 |
| 2020/0037396 | A1* | 1/2020 | Islam | H04W 76/27 |
| 2020/0100327 | A1* | 3/2020 | Zhang | H04L 25/0226 |

OTHER PUBLICATIONS

International Search Report and Written Opinion—PCT/US2019/068466—ISA/EPO—dated Apr. 21, 2020.

Mediatek Inc: "Triggering Adaptation for UE Power Saving", 3GPP Draft, 3GPP TSG RAN WG1 Meeting #95, R1-1812362 Triggering Adaptation for UE Power Saving_Final, 3rd Generation Partnership Project (3GPP), Mobile Competence Centre, 650, Route Des Lucioles, F-06921 Sophia-Antipolis Cedex, vol. RAN WG1, No. Spokane, USA, Nov. 12, 2018-Nov. 16, 2018, Nov. 11, 2018 (Nov. 11, 2018), XP051554271, 12 pages, Retrieved from the Internet: URL: http://www.3gpp.org/ftp/Meetings%5F3GPP%5FSYNC/RAN1/Docs/R1%2D1812362%2Ezip, [retrieved on Nov. 11, 2018], the whole document.

Oppo: "Triggering Adaptation of UE Power Consumption Characteristics", 3GPP Draft, 3GPP TSG RAN WG1 Meeting #95, R1-1812825, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), XP051554785, 4 pages, Retrieved from the Internet: URL: http://www.3gpp.org/ftp/Meetings%5F3GPP%5FSYNC/RAN1/Docs/R1%2D1812825%2Ezip, [retrieved on Nov. 11, 2018], the whole document.

Samsung: "Triggering Adaptation Schemes", 3GPP Draft, 3GPP TSG RAN WG1 Meeting #95, R1-1813012 Triggering Adaptation Schemes, 3rd Generation Partnership Project (3GPP), Mobile Competence Centre, 650, Route Des Lucioles, F-06921 Sophia-Antipolis Cedex, France, vol. RAN WG1. No. Spokane, USA, Nov. 12, 2018-Nov. 16, 2018, Nov. 11, 2018 (Nov. 11, 2018), XP051554990, 9 pages, Retrieved from the Internet: URL: http://www.3gpp.org/ftp/Meetings%5F3GPP%5FSYNC/RAN1/Docs/R1%2D1813012%2Ezip, [retrieved on Nov. 11, 2018], the whole document.

* cited by examiner

DYNAMIC CONFIGURATION OF OPERATION POWER PARAMETERS

CROSS-REFERENCE TO RELATED APPLICATION

This application claims priority to U.S. Provisional Patent Application No. 62/789,304, filed on Jan. 7, 2019, entitled "DYNAMIC CONFIGURATION OF POWER PARAMETER VALUES," which is hereby expressly incorporated by reference herein.

BACKGROUND

Field

Aspects of the present disclosure generally relate to wireless communication, and more particularly to techniques and apparatuses for dynamic configuration of power parameter values.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

Battery life is an important consideration for UEs, especially for UEs for which battery replacement may be difficult, like a narrowband Internet of Things (NB-IoT) UE that operates in a remote geographic area. However, throughput is also an important consideration for UEs, and often directly conflicts with power savings and battery life since more power is required for high throughput as compared to low throughput. In some cases, a UE may use a discontinuous reception (DRX) cycle to transition between a sleep state and an active state to conserve battery power when there is no data for the UE to transmit or receive. However, a UE may benefit from additional power saving in addition to a DRX cycle or as an alternative to a DRX cycle.

Some techniques and apparatuses described herein permit a UE to transition among different power configurations, which are defined by different values for different operation power parameters (e.g., transmission power parameters or reception power parameters), that impact the amount of power consumed by the UE (e.g., to communicate with a base station or to perform other operations). In some aspects, these transitions may be signaled by a base station based at least in part on traffic volume for the UE, which may assist with improving throughput (e.g., when data is available for the UE), and which may assist with extending battery life of the UE (e.g., when data is not available for the UE). Furthermore, these transitions may be signaled dynamically, such as in downlink control information (DCI) and/or a media access control (MAC) control element (CE) (MAC-CE), which may conserve battery power as compared to reconfiguring the UE using a radio resource control (RRC) message, and which may allow the UE to be reconfigured quickly as conditions associated with the UE change. Furthermore, some techniques and apparatuses described herein are capable of indicating power configurations using a small amount of overhead, thereby conserving network resources.

In an aspect of the disclosure, a method, a UE, a base station, an apparatus, and a computer program product are provided.

In some aspects, the method may by performed by a UE. The method may include receiving a first indication of a set of operation power parameters from a plurality of sets of operation power parameters and a second indication of a set of values for the set of operation power parameters; and configuring the UE to operate using a power configuration, of a plurality of power configurations, based at least in part on the set of values for the set of operation power parameters, wherein each power configuration, of the plurality of power configurations, is defined by a corresponding set of operation power parameters, of the plurality of sets of operation power parameters, with a corresponding set of values.

In some aspects, the UE may include a memory and one or more processors operatively coupled to the memory. The memory and the one or more processors may be configured to receive a first indication of a set of operation power parameters from a plurality of sets of operation power parameters and a second indication of a set of values for the set of operation power parameters; and configure the UE to operate using a power configuration, of a plurality of power configurations, based at least in part on the set of values for the set of operation power parameters, wherein each power configuration, of the plurality of power configurations, is defined by a corresponding set of operation power parameters, of the plurality of sets of operation power parameters, with a corresponding set of values.

In some aspects, the apparatus may include means for receiving a first indication of a set of operation power parameters from a plurality of sets of operation power parameters and a second indication of a set of values for the set of operation power parameters; and means for configuring the UE to operate using a power configuration, of a plurality of power configurations, based at least in part on the set of values for the set of operation power parameters, wherein each power configuration, of the plurality of power configurations, is defined by a corresponding set of operation power parameters, of the plurality of sets of operation power parameters, with a corresponding set of values.

In some aspects, the computer program product may include a non-transitory computer-readable medium storing one or more instructions. The one or more instructions, when executed by one or more processors of a UE, may cause the one or more processors to receive a first indication of a set of operation power parameters from a plurality of sets of operation power parameters and a second indication of a set of values for the set of operation power parameters; and configure the UE to operate using a power configuration, of a plurality of power configurations, based at least in part on the set of values for the set of operation power parameters, wherein each power configuration, of the plurality of power configurations, is defined by a corresponding set of operation power parameters, of the plurality of sets of operation power parameters, with a corresponding set of values.

In some aspects, the method may by performed by a base station. The method may include transmitting, to a UE, a first indication of a set of operation power parameters from a plurality of sets of operation power parameters and a second indication of a set of values for the set of operation power parameters; and communicating with the UE in accordance with a power configuration, of a plurality of power configurations, configured based at least in part on the set of values for the set of operation power parameters, wherein each power configuration, of the plurality of power configurations, is defined by a corresponding set of operation power parameters, of the plurality of sets of operation power parameters, with a corresponding set of values.

In some aspects, the base station may include a memory and one or more processors operatively coupled to the memory. The memory and the one or more processors may be configured to transmit, to a UE, a first indication of a set of operation power parameters from a plurality of sets of operation power parameters and a second indication of a set of values for the set of operation power parameters; and communicate with the UE in accordance with a power configuration, of a plurality of power configurations, configured based at least in part on the set of values for the set of operation power parameters, wherein each power configuration, of the plurality of power configurations, is defined by a corresponding set of operation power parameters, of the plurality of sets of operation power parameters, with a corresponding set of values.

In some aspects, the apparatus may include means for transmitting, to a UE, a first indication of a set of operation power parameters from a plurality of sets of operation power parameters and a second indication of a set of values for the set of operation power parameters; and means for communicating with the UE in accordance with a power configuration, of a plurality of power configurations, configured based at least in part on the set of values for the set of operation power parameters, wherein each power configuration, of the plurality of power configurations, is defined by a corresponding set of operation power parameters, of the plurality of sets of operation power parameters, with a corresponding set of values.

In some aspects, the computer program product may include a non-transitory computer-readable medium storing one or more instructions. The one or more instructions, when executed by one or more processors of a base station, may cause the one or more processors to transmit, to a UE, a first indication of a set of operation power parameters from a plurality of sets of operation power parameters and a second indication of a set of values for the set of operation power parameters; and communicate with the UE in accordance with a power configuration, of a plurality of power configurations, configured based at least in part on the set of values for the set of operation power parameters, wherein each power configuration, of the plurality of power configurations, is defined by a corresponding set of operation power parameters, of the plurality of sets of operation power parameters, with a corresponding set of values.

Aspects generally include a method, apparatus, system, computer program product, non-transitory computer-readable medium, user equipment, base station, wireless communication device, and processing system as substantially described herein with reference to and as illustrated by the accompanying drawings and/or specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
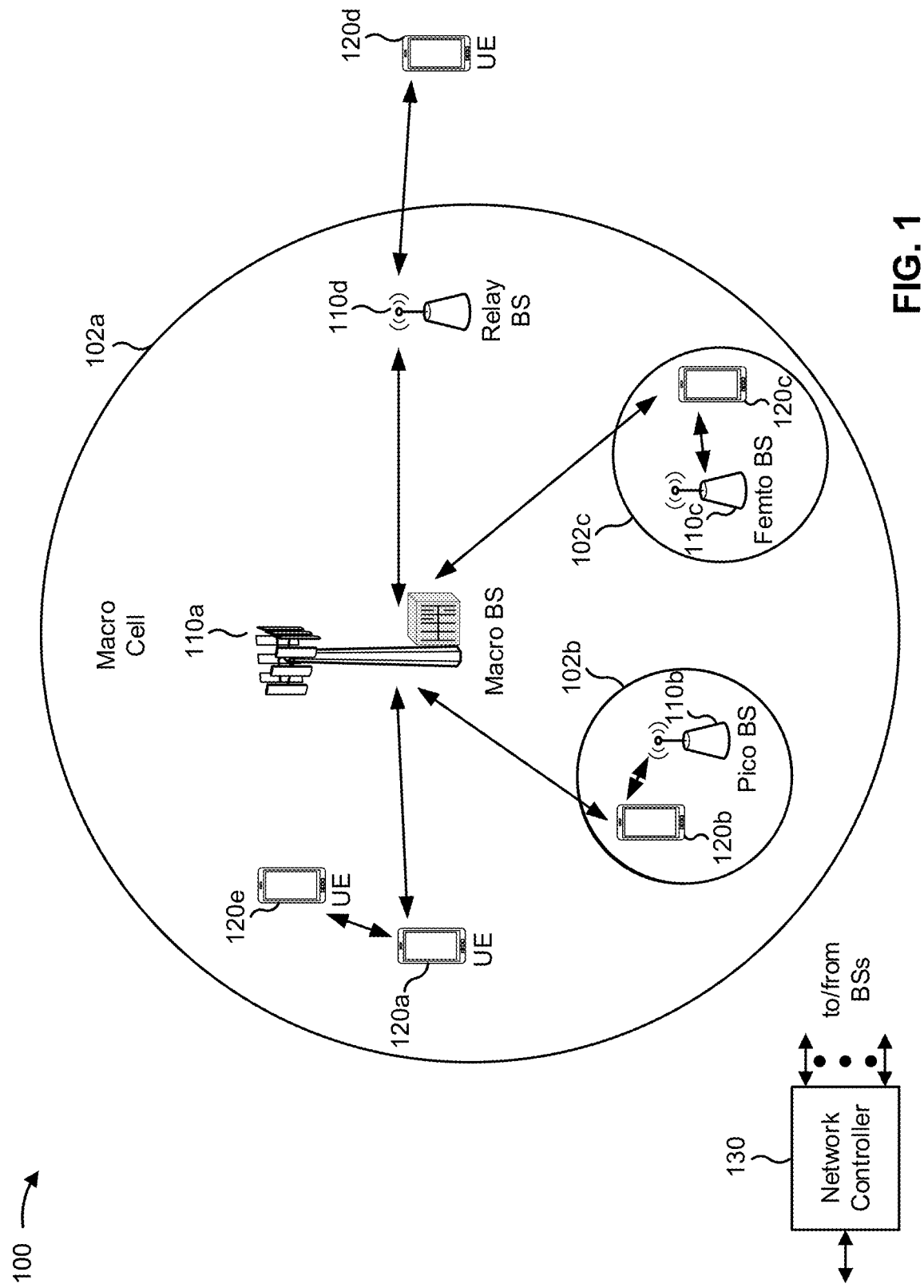
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. Wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110a and UE 120d. A relay station may also be referred to as a relay BS, a relay base station, a relay, and/or the like.

Wireless network 100 may be a heterogeneous network that includes B Ss of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
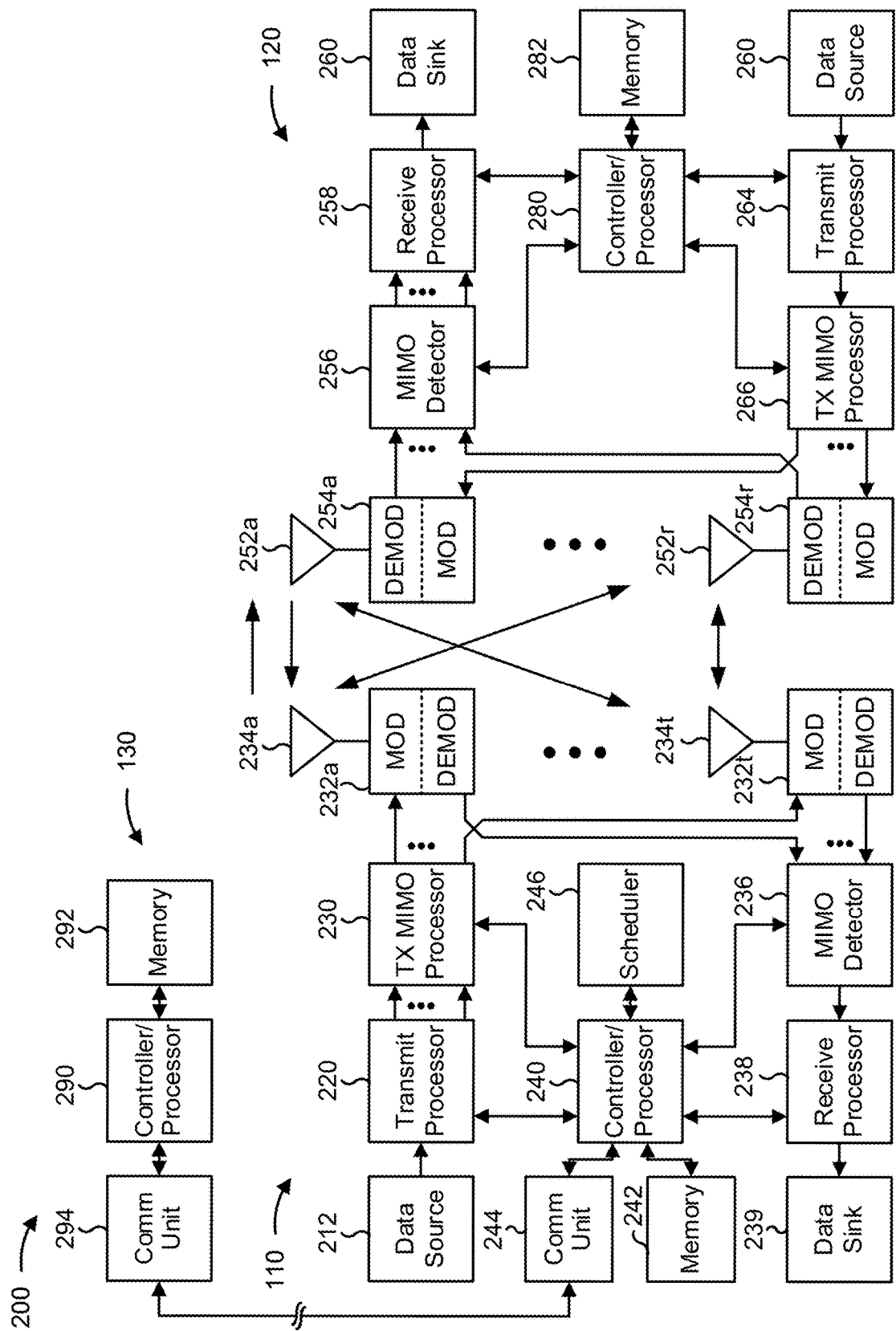
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with dynamic configuration of power parameter values, as described in more detail elsewhere herein. For example, controller/processor 240 of base station 110, controller/processor 280 of UE 120, and/or any other component(s) of FIG. 2 may perform or direct operations of, for example, method 500 of FIG. 5, method 600 of FIG. 6, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

Battery life is an important consideration for UEs 120, especially for UEs 120 that operate in remote areas that may not be easily accessible to replace a battery, such as an NB-IoT UEs and/or the like. However, throughput is also an important consideration for UEs 120, and often directly conflicts with power savings and battery life since more power is required for high throughput as compared to low throughput. In some cases, a UE 120 may use a discontinuous reception (DRX) cycle to transition between a sleep state and an active state to conserve battery power when there is no data for the UE 120 to transmit or receive. However, a UE 120 may benefit from additional power saving in addition to a DRX cycle or as an alternative to a DRX cycle.

Some techniques and apparatuses described herein permit a UE 120 to transition among different power configurations, which are defined by different values for different operation power parameters (e.g., transmission power parameters and/or reception power parameters), that impact the amount of power consumed by the UE 120 (e.g., to communicate with a base station 110 or to perform other operations). An operation power of UE 120 may include a transmit power or a receive power, which may be affected by an operation power parameter, such as a transmit power parameter or a receive power parameter. Based at least in part on enabling UE 120 to transition among different power configurations associated with different values for different operation power parameters, UE 120 may optimize an operation power of UE 120 (e.g., UE 120 may optimize a transmit power for transmissions to BS 110 or a receive power for reception of signaling from BS 110).

In some aspects, these transitions may be signaled by a base station 110 based at least in part on traffic volume for the UE 120, which may assist with improving throughput (e.g., when data is available for the UE 120), and which may assist with extending battery life of the UE 120 (e.g., when data is not available for the UE 120). Furthermore, these transitions may be signaled dynamically, such as in downlink control information (DCI) and/or a media access control (MAC) control element (CE) (MAC-CE), which may conserve battery power as compared to reconfiguring the UE 120 using a radio resource control (RRC) message, and which may allow the UE 120 to be reconfigured quickly as conditions associated with the UE 120 change. Furthermore, some techniques and apparatuses described herein are capable of indicating power configurations using a small amount of overhead, thereby conserving network resources.

Figure 3:
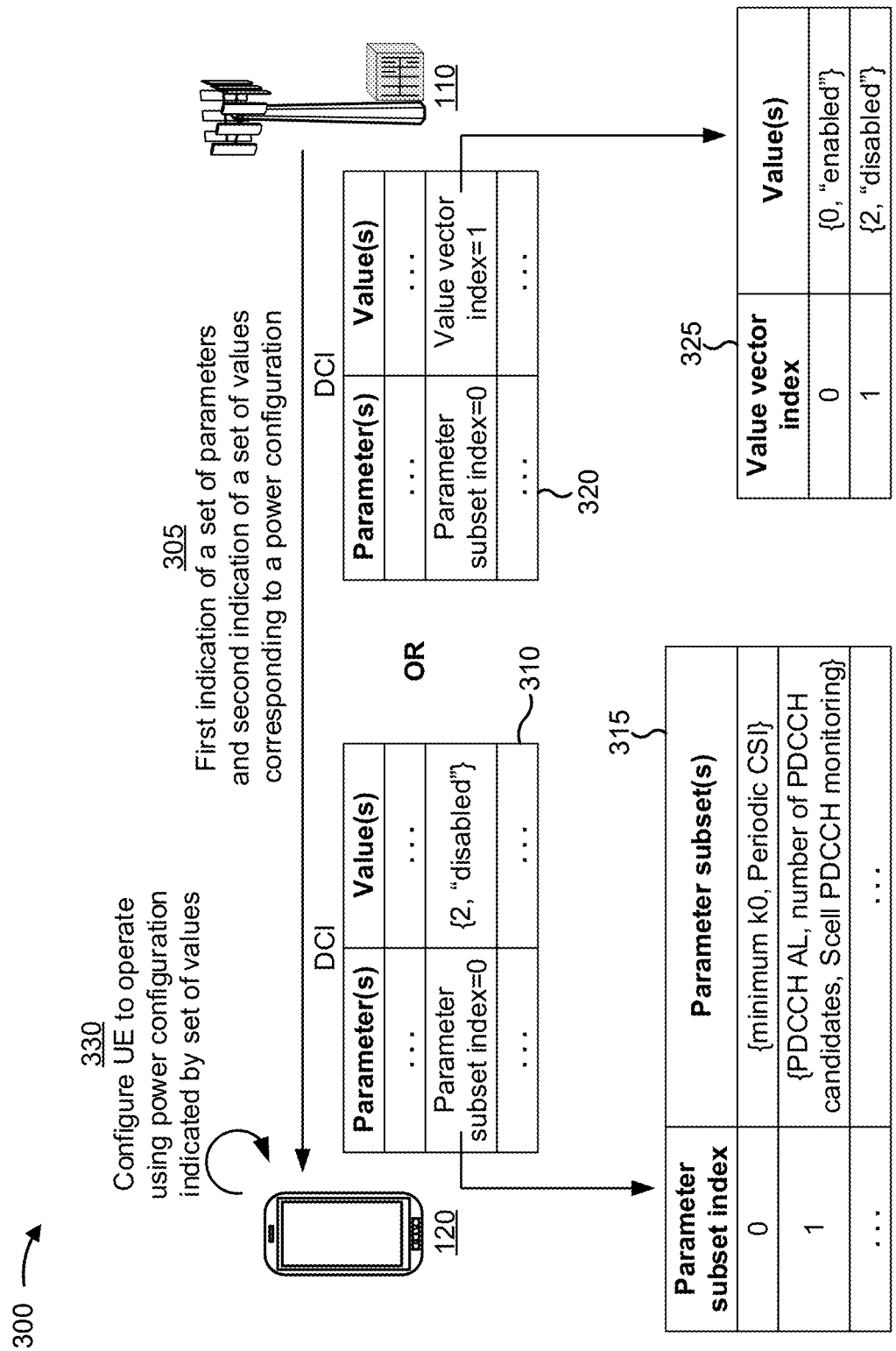
FIG. 3 is a diagram illustrating an example of dynamic configuration of power parameter values.

FIG. 3 is a diagram illustrating an example 300 of dynamic configuration of power parameter values.

At 305, a UE 120 may receive, from a base station 110, a first indication of a set of operation power parameters and a second indication of a set of values associated with the set of operation power parameters. The set of values for the set of operation power parameter may define a power configuration (e.g., for transmission and/or for reception) for the UE 120. As is described in more detail below, in some aspects, the first indication and the second indication may be included in DCI (e.g., UE-specific DCI, group-common DCI, cell-specific DCI, and/or the like), a MAC-CE, or a combination of the DCI and the MAC-CE. The set of operation power parameters may be selected from a plurality of sets of operation power parameters that are configurable (e.g., are capable of having different values) to achieve different power configurations for the UE 120. In other words, a first power configuration may be defined by a first subset of possible operation power parameters configured with a first set of values and a second power configuration may be defined by a second subset of possible operation power parameters configured with a second set of values. In this case, at least one operation power parameter or at least one value may differ between the first subset of possible operation power parameters and the second subset of possible operation power parameters or the first set of values and the second set of values, respectively, to define different power configurations.

The set of values may include a value for each operation power parameter included in the set of operation power parameters. In some aspects, the set of values may define a power configuration for the UE 120, and/or different sets of values may correspond to different power configurations for the UE 120. Thus, the UE 120 may be capable of operating using different power configurations, which may consume a different amount of power for communications of the UE 120, may cause the UE 120 to operate with different power consumption rates, and/or the like.

In some aspects, the base station 110 may determine the set of operation power parameters and/or may select the set of operation power parameters, from the plurality of sets of operation power parameters, based at least in part on a capability of the UE 120, which may be signaled to the base station 110 in a UE capability report, may depend on a device type of the UE 120 signaled to the base station 110 (e.g., a UE class, a UE category, and/or the like), and/or the like. For example, the UE capability report may indicate one or more operation power parameters that can be configured or reconfigured for the UE 120, and the base station 110 may select a set of operation power parameters to be configured for the UE 120 based at least in part on such a capability. In this case, as an example, the UE capability report may indicate that UE 120 is capable of having a bandwidth part for UE 120 configured to a particular bandwidth part (e.g., the particular bandwidth part may be a value for a bandwidth part configuration parameter) and/or that a delay between a DCI and an uplink associated therewith is configurable to a particular quantity of slots or symbols (e.g., the particular quantity may be a value for a DCI to uplink transmission delay configuration parameter). In this way, the base station 110 may ensure that the UE 120 is capable of reconfiguring operation power parameters indicated by the base station 110, thereby reducing errors, improving battery life and/or throughput (e.g., according to the configuration), and/or the like.

Additionally, or alternatively, the base station 110 may determine the set of values and/or may select the set of values, from a plurality of sets of values, based at least in part on a capability of the UE 120, a device type of the UE 120, and/or the like, in a similar manner as described above. For example, a UE capability report may indicate, for one or more operation power parameters, values with which the UE 120 is capable of configuring an operation power parameter. Returning to the previous example, the UE capability report may identify a bandwidth part that is to be configured for UE 120, a value for the quantity of slots or symbols, and/or the like. The base station 110 may select a set of values with which to configure the set of operation power parameters based at least in part on such a capability. In this way, the base station 110 may ensure that the UE 120 is capable of reconfiguring operation power parameters indicated by the base station 110, thereby reducing errors, improving battery life and/or throughput (e.g., according to the configuration), and/or the like.

Additionally, or alternatively, the base station 110 may determine the set of values based at least in part on whether there is data available for the UE 120, based at least in part on a volume of network traffic (e.g., data) associated with the UE 120, and/or the like. For example, if there is data available for the UE 120 or if the amount of network traffic associated with the UE 120 satisfies a threshold, then the base station 110 may configure the UE 120 with a set of values for a set of operation power parameters that results in a high throughput (e.g., and high power consumption) power configuration for the UE 120. For example, the base station 110 may configure the UE 120 with a wide bandwidth part that is larger than a threshold, a short downlink control channel monitoring periodicity that is smaller than a threshold, a large number of MIMO layers that is larger than a threshold, a short hybrid automatic repeat request (HARQ) timeline that is larger than a threshold, and/or the like. Conversely, if there is no data available for the UE 120 or if the amount of network traffic associated with the UE 120 does not satisfy a threshold, then the base station 110 may configure the UE 120 with a set of values for a set of operation power parameters that results in a low power consumption (e.g., and low throughput) power configuration for the UE 120. For example, the base station 110 may configure the UE 120 with a narrow bandwidth part, a long downlink control channel monitoring periodicity, a small number of MIMO layers, a long hybrid automatic repeat request (HARQ) timeline, and/or the like.

In some aspects, the plurality of sets of operation power parameters and/or the plurality of sets of values may be predetermined (e.g., specified according to a wireless communication standard). Additionally, or alternatively, the plurality of sets of operation power parameters and/or the plurality of sets of values may be indicated to the UE 120 by the base station 110 in a signaling message, such as an RRC message (e.g., an RRC configuration message, an RRC reconfiguration message, and/or the like) and/or another signaling message.

At 310, in some aspects, the first indication and the second indication may be transmitted and/or received in DCI. For example, a first field of the DCI (shown as "Parameter(s)") may indicate the set of operation power parameters, and a second field of the DCI (shown as "Value(s)") may indicate the set of values to be configured for the set of operation power parameters. In example 300, the set of operation power parameters is indicated using an index, for the first indication, with an index value of zero (shown as "Parameter subset index=0").

Although some aspects are described herein as using an index value for the first indication, other types of indicators may be used for the first indication. Additionally, or alternatively, the first DCI field may explicitly identify a single operation power parameter (e.g., rather than an index that points to a set of operation power parameters), and the second DCI field may indicate a value for the single operation power parameters. In some aspects, multiple instances of the first DCI field and the second DCI field may be used to indicate multiple operation power parameters and values corresponding to those operation power parameters. Furthermore, although the index values are shown as being expressed using a number (e.g., an integer), the index values may be expressed using an enumeration, in some aspects. As further shown, the set of values may be included in the DCI (e.g., may be explicitly indicated in the second field of the DCI). Alternatively, the second field of DCI may include an index (referred to herein as a value vector index) to indicate the set of values, as described below.

At 315, the index value may correspond to and/or identify the set of operation power parameters. For example, a first index value (shown as "0") may correspond to a first set of operation power parameters (shown as two operation power parameters: "{minimum k0, periodic CSI}"), a second index value (shown as "1") may correspond to a second set of operation power parameters (shown as three operation power parameters: "{PDCCH AL, number of PDCCH candidates, Scell PDCCH monitoring}"), and so on. In some aspects, a set of operation power parameters may include a single operation power parameter. In some aspects, a set of operation power parameters may include multiple operation power parameters (e.g., a list of operation power parameters). Although example 300 shows an index value in the first field of the DCI, in some aspects, the first field of the DCI may list the set of operation power parameters (e.g., the set of operation power parameters may be explicitly indicated in the DCI, rather than identified using an index value). In some aspects, the DCI may be a particular type of DCI.

For example, when the first indication and the second indication are outside of an active time of the UE, the first indication and the second indication may be a PDCCH wake up signal DCI. Additionally, or alternatively, the DCI may be a DCI type 0-1, a DCI type 1-1, and/or the like.

In some aspects, relationships between index values and corresponding sets of operation power parameters (e.g., a one to one relationship between a single index value and a single set of one or more operation power parameters) may be predetermined (e.g., specified according to a wireless communication standard). Additionally, or alternatively, one or more relationships between index value(s) and set(s) of operation power parameters may be indicated to the UE 120 by the base station 110 in a signaling message, such as an RRC message and/or the like. In this way, the UE 120 and the base station 110 may use an index value or a similar indicator to identify a set of operation power parameters, thereby conserving signaling overhead (e.g., in DCI, a MAC-CE, and/or the like).

At 320, in some aspects, the second indication may include a value vector index that indicates the set of values. In example 300, the set of values is indicated using a value vector index with an index value of 1 (shown as "Value vector index=1"). Although some aspects are described herein as using an index value for the second indication, other types of indicators may be used for the second indication.

At 325, the value vector index may correspond to and/or identify the set of values. For example, a first value vector index value (shown as "0") may correspond to a first set of values (shown as two values: "{0, "enabled"}"), a second value vector index value (shown as "1") may correspond to a second set of values (shown as two values: "{2, "disabled"}"), and so on. In some aspects, a set of values may include a single value (e.g., when the set of operation power parameters includes a single operation power parameter. In some aspects, a set of values may include multiple values (e.g., when the set of operation power parameters includes multiple operation power parameters). In some aspects, the number of values included in the set of values may be the same as the number of operation power parameters included in the set of operation power parameters to which the set of values corresponds.

In some aspects, relationships between vector indices and corresponding sets of values (e.g., a one to one relationship between a single index value and a single set of one or more values) may be predetermined (e.g., specified according to a wireless communication standard). Additionally, or alternatively, one or more relationships between vector index value(s) and set(s) of values may be indicated to the UE 120 by the base station 110 in a signaling message, such as an RRC message and/or the like. In this way, the UE 120 and the base station 110 may use a vector index value or a similar indicator to identify a set of values, thereby conserving signaling overhead (e.g., in DCI, a MAC-CE, and/or the like).

At 330, the UE 120 may configure itself to operate using a power configuration indicated by the set of values, indicated by the second indication, for the set of operation power parameters indicated by the first indication. For example, the UE 120 may configure the set of operation power parameters using the set of values. Additionally, or alternatively, the base station 110 may configure communications with the UE 120 based at least in part on the power configuration (e.g., the set of values for the set of operation power parameters). The UE 120 and the base station 110 may communicate based at least in part on the power configuration.

In some aspects, if the UE 120 is not capable of configuring an indicated operation power parameter with a value indicated for the operation power parameters, then the UE 120 may ignore such indications and may continue to operate using a value, for the operation power parameter, with which the UE 120 is already operating. Alternatively, the UE 120 may configure the indicated operation power parameter with a value that the UE 120 is capable of using and that is closest to an indicated value. In some aspects, the set of values indicated to the UE 120 may include a null value for one or more operation power parameters. For example, the base station 110 may transmit a null value for an operation power parameter based at least in part on a determination that the UE 120 is not capable of configuring the operation power parameter (e.g., according to a UE capability report and/or the like, as described above). In this case, the UE 120 may continue to operate using a value, for the operation power parameter, with which the UE 120 is already operating. In this way, errors may be reduced while still permitting configuration of other operation power parameters to improve battery life, improve throughput, and/or the like.

In some aspects, different sets of operation power parameters may include different combinations of operation power parameters from a global set of operation power parameters that includes all possible operation power parameters capable of being reconfigured for a power configuration. In this case, a message that includes all operation power parameters for communication may be a bandwidth part switch message. In some aspects, all of the sets of operation power parameters, other than the global set of operation power parameters, are mutually exclusive. In this case, a specific operation power parameter is only included in a single set of operation power parameters. Alternatively, an operation power parameter may be included in multiple sets of operation power parameters. In some aspects, the set of operation power parameters indicated to the UE 120 may be the global set of operation power parameters that includes all operation power parameters included in all other sets of operation power parameters of the plurality of sets of operation power parameters.

In some aspects, the set of operation power parameters may include one or more frequency domain configuration operation power parameters, such as an operation power parameter relating to a reference signal for bandwidth part (BWP) switching (e.g., whether to enable or disable UE monitoring and/or processing of the reference signal), an operation power parameter relating to a BWP configuration (e.g., a BWP index for a BWP via which the UE 120 is to communicate and/or monitor for a wakeup signal, whether to switch to a default BWP upon wakeup, whether to remain on an active BWP at wakeup, and/or the like), an operation power parameter relating to secondary cell (SCell) activation (e.g., whether SCells are enabled or disabled), an operation power parameter indicating whether to monitor and/or decode a physical downlink control channel (PDCCH) of an SCell (e.g., shown as "Scell PDCCH monitoring" in FIG. 3), an operation power parameter indicating whether SCells use self-scheduling or cross-carrier scheduling, an operation power parameter indicating whether search spaces are shared across cells (e.g., serving cells), an operation power parameter indicating one or more SCells to which one or more of the above frequency domain configuration operation power parameters are to be applied, and/or the like.

Additionally, or alternatively, the set of operation power parameters may include one or more time domain configuration operation power parameters, such as an operation power parameter indicating a time delay (e.g., in slots, symbols, and/or the like) between DCI (e.g., on the PDCCH) and a corresponding data or reference signal transmission (e.g., where the UE 120 can configure a low power configuration during the time delay), an operation power parameter indicating a time domain resource allocation (TDRA) table to be used by the UE 120, and/or the like.

Additionally, or alternatively, the set of operation power parameters may include one or more scheduling configuration operation power parameters, such as an operation power parameter indicating whether to use slot-based or non-slot-based scheduling, an operation power parameter indicating whether multi-slot scheduling is enabled or disabled (e.g., multi-slot scheduling with a single DCI scheduling data or a reference signal in multiple slots), and/or the like.

Additionally, or alternatively, the set of operation power parameters may include one or more multiple input multiple output (MIMO) configuration operation power parameters, such as an operation power parameter indicating a number of antennas, panels, and/or beams to be used by the UE 120 and/or the base station 110, an operation power parameter indicating a number of MIMO layers to be used by the UE 120 (e.g., for transmission, for reception, and/or the like), an operation power parameter indicating a maximum number of antennas, panels, beams, layers, and/or rank values to be used by the UE 120, an operation power parameter indicating whether the UE 120 is to process or report measurements of channel state information reference signals (CSI-RS) regardless of whether periodic CSI-RS are configured for the UE 120 (e.g., shown as "Periodic CSI" in FIG. 3), and/or the like.

Additionally, or alternatively, the set of operation power parameters may include one or more discontinuous reception (DRX) configuration operation power parameters, such as one or more DRX timer values to be used by the UE 120 (e.g., an on-duration timer, an inactivity timer, a short cycle timer, and/or the like), an indication of whether a DRX short cycle is enabled or disabled, and/or the like.

Additionally, or alternatively, the set of operation power parameters may include one or more processing timeline configuration operation power parameters, such as an operation power parameter indicating a minimum timing offset to be used by the UE 120 for one or more k values (e.g., a k0 value indicating a timing between a downlink grant and corresponding downlink data transmission, a k1 value indicating a timing between a downlink data transmission and corresponding acknowledgement (ACK) or negative acknowledgement (NACK) feedback, a k2 value indicating a timing between an uplink grant and a corresponding uplink data transmission, a k3 value indicating a timing between ACK or NACK feedback and a corresponding downlink data retransmission, and/or the like), an operation power parameter indicating a minimum timing offset to be used for CSI (e.g., a timing between DCI and aperiodic CSI-RS), and/or the like. For example, an operation power parameter indicating a minimum k0 value (shown as "minimum k0") is shown in FIG. 3.

Additionally, or alternatively, the set of operation power parameters may include one or more downlink control channel (e.g., PDCCH) configuration operation power parameters, such as an operation power parameter indicating a periodicity of monitoring occasions, an operation power parameter indicating one or more downlink control channel candidate aggregation levels to be monitored by the UE 120 (e.g., shown as "PDCCH AL" in FIG. 3), an operation power parameter indicating a number of downlink control channel candidates to be monitored for one or more configured aggregation levels (e.g., shown as "number of PDCCH candidates" in FIG. 3), an operation power parameter indicating one or more control resource sets (CORESETs) to be monitored by the UE 120, an operation power parameter indicating one or more search space sets to be monitored by the UE 120, an operation power parameter indicating one or more DCI formats to be monitored by the UE 120, an operation power parameter indicating one or more cells to which one or more of the above downlink control channel configuration operation power parameters are to be applied, and/or the like.

Additionally, or alternatively, the set of operation power parameters may include one or more wakeup signal configuration operation power parameters, such as an operation power parameter indicating whether the UE 120 is to monitor for and/or process wakeup signals, and/or the like.

Additionally, or alternatively, the set of operation power parameters may include one or more radio resource management (RRM) configuration operation power parameters, such as an operation power parameter indicating a configuration for RRM, an operation power parameter indicating a periodicity of measurement occasions, an operation power parameter indicating one or more cells to which one or more of the above RRM configuration operation power parameters are to be applied, and/or the like.

By dynamically signaling a set of operation power parameters (e.g., power operation power parameters) and a corresponding set of values for those operation power parameters, the base station 110 may activate different power configurations for the UE 120, which may assist with quickly reconfiguring the UE 120 as conditions associated with the UE 120 change. For example, the UE 120 may be reconfigured to a high throughput power configuration to improve throughput when a large amount of data is available for the UE 120 (e.g., a threshold amount of data), and may be reconfigured to a low power consumption setting to extend battery life of the UE 120 when a small amount of data or no data is available for the UE 120. Furthermore, signaling different power configurations using DCI (and/or a MAC-CE, as described below in connection with FIG. 4) may conserve battery power of the UE 120 and/or may conserve network resources as compared to reconfiguring the UE 120 using an RRC message (e.g., which may be a larger message than DCI and/or a MAC-CE).

As indicated above, FIG. 3 is provided as an example. Other examples may differ from what is described with respect to FIG. 3.

Figure 4:
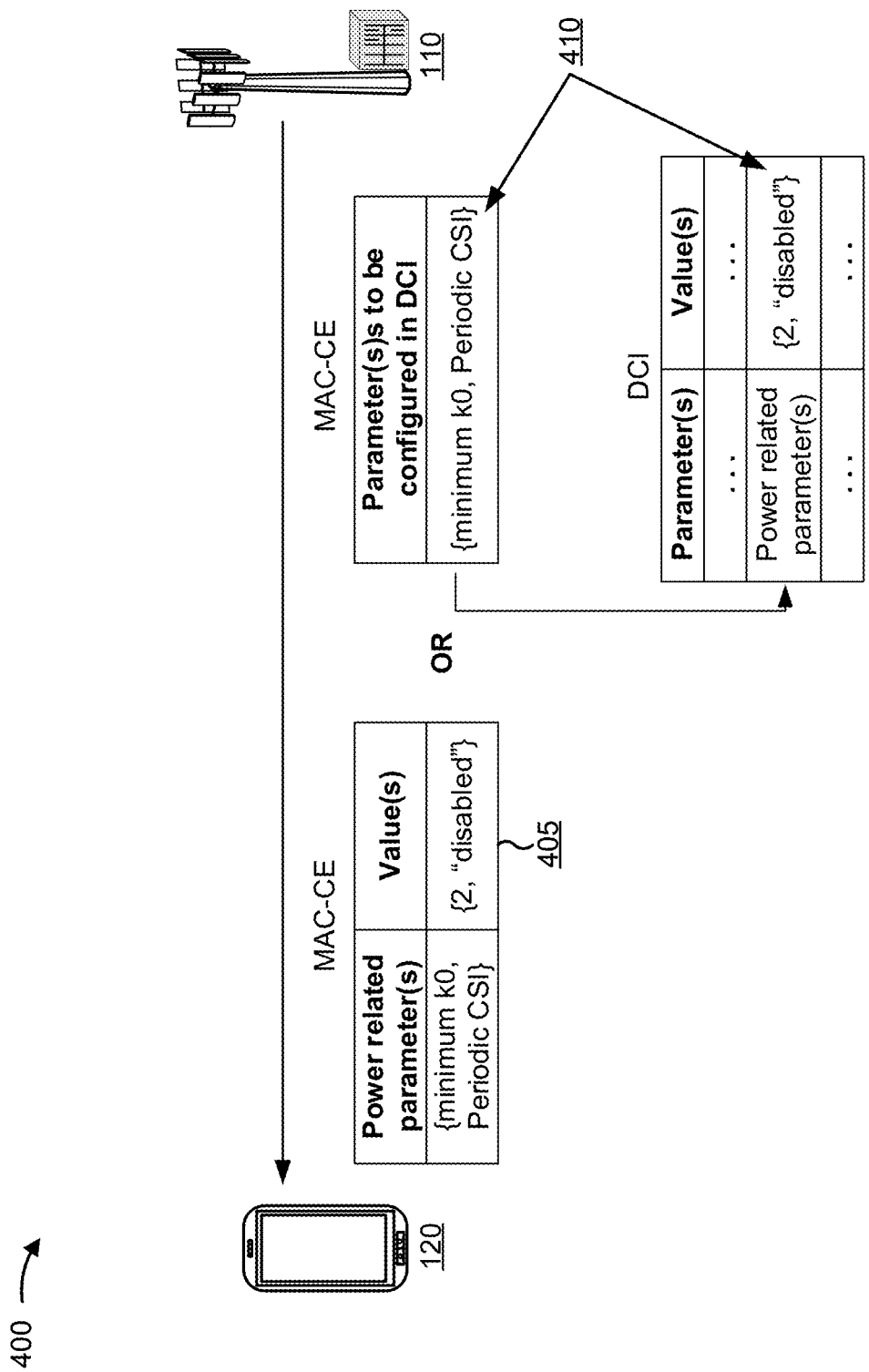
FIG. 4 is a diagram illustrating another example of dynamic configuration of power parameter values.

FIG. 4 is a diagram illustrating an example 400 of dynamic configuration of power operation power parameter values. FIG. 4 shows an example of using a MAC-CE in addition to or as an alternative to using DCI to configure a power configuration for the UE 120, as described above in connection with FIG. 3.

At 405, in some aspects, the set of operation power parameters (shown as "Power related operation power parameter(s)") and the set of values (shown as "Value(s)") corresponding to the set of operation power parameters may be indicated in a MAC-CE. The set of operation power parameters may be indicated using a first indication in the MAC-CE, and the set of values may be indicated using a second indication in the MAC-CE. Additional details are described above in connection with FIG. 3. For example, any of the techniques described above in connection with indicating the set of operation power parameters and/or the set of values in DCI can be applied when indicating the set of operation power parameters and/or the set of values in the MAC-CE. This may reduce DCI and/or MAC-CE overhead and may simplify UE processing, which may conserve battery power of the UE 120.

At 410, in some aspects, the first indication of the set of operation power parameters may be included in a MAC-CE, and the second indication of the set of values corresponding to the set of operation power parameters may be indicated in DCI. This may reduce DCI overhead and provide the ability for flexible, quick reconfiguration of operation power parameter values.

As indicated above, FIG. 4 is provided as an example. Other examples may differ from what is described with respect to FIG. 4.

Figure 5:
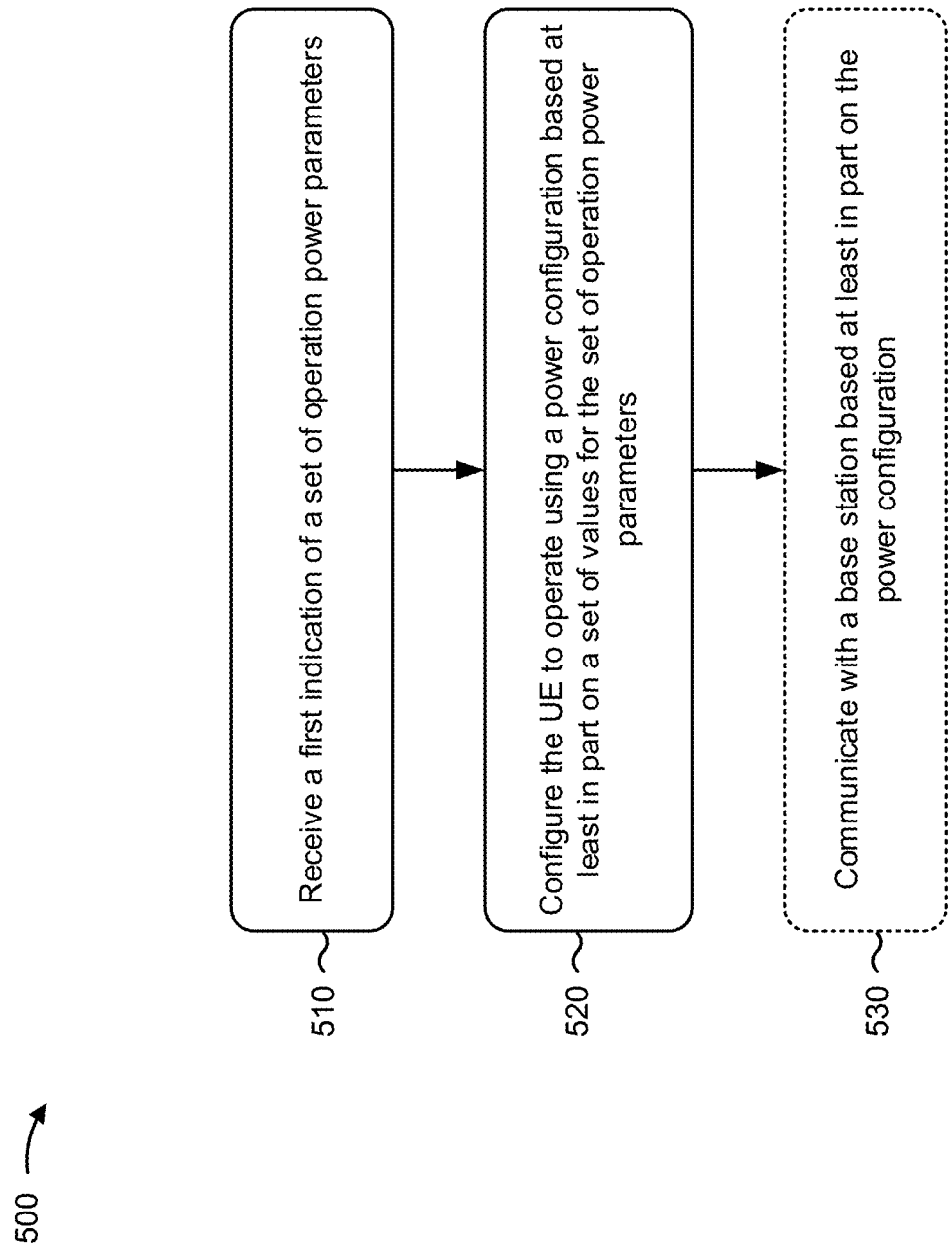
FIG. 5 is a flow chart of a method of wireless communication.

FIG. 5 is a flow chart of a method 500 of wireless communication. The method may be performed by a UE (e.g., the UE 120, the apparatus 702/702', and/or the like).

At 510, the UE may receive a first indication of a set of operation power parameters.

For example, the UE (e.g., using antenna 252, DEMOD 254, MIMO detector 256, receive processor 258, controller/processor 280, and/or the like) may receive a first indication of a set of operation power parameters from a plurality of sets of operation power parameters and a second indication of a set of values for the set of operation power parameters, as described above. For example, the UE may receive information indicating that the UE is to configure some subset of possible operation power parameters and may receive information indicating that the UE is to configure that some subset of possible operation power parameters with some set of values. In some aspects, the UE may receive the first indication and/or the second indication in at least one of DCI or a MAC-CE.

In a first aspect, the set of operation power parameters includes a list of operation power parameters. In a second aspect, alone or in combination with the first aspect, the set of values is included in at least one of downlink control information (DCI) or a media access control (MAC) control element (CE) (MAC-CE). In a third aspect, alone or in combination with one or more of the first and second aspects, the set of values is indicated using a value vector index included in the DCI or the MAC-CE, wherein the value vector index corresponds to the set of values. In a fourth aspect, alone or in combination with one or more of the first through third aspects, the value vector index is one of a plurality of value vector indexes, and wherein each different value vector index, of the plurality of value vector indexes, corresponds to a different set of values of a plurality of sets of values.

In a fifth aspect, alone or in combination with one or more of the first through fourth aspects, a relationship between the plurality of value vector indexes and the plurality of sets of values is predetermined or indicated to the UE in a radio resource control (RRC) message. In a sixth aspect, alone or in combination with one or more of the first through fifth aspects, one set of operation power parameters, of the plurality of sets of operation power parameters, includes all operation power parameters included in all other sets of operation power parameters of the plurality of sets of operation power parameters. In a seventh aspect, alone or in combination with one or more of the first through sixth aspects, the one set of operation power parameters is in a bandwidth part switch message. In an eighth aspect, alone or in combination with one or more of the first through seventh aspects, the first indication and the second indication are received in a downlink control information (DCI).

In a ninth aspect, alone or in combination with one or more of the first through eighth aspects, the DCI is at least one of a UE-specific DCI, a DCI format 0-1, a DCI format 1-1, a group-Common DCI, or a wakeup signal. In a tenth aspect, alone or in combination with one or more of the first through ninth aspects, the first indication and the second indication are received in a medium access control (MAC) control element (CE) (MAC-CE). In an eleventh aspect, alone or in combination with one or more of the first through tenth aspects, the first indication is received in a medium access control (MAC) control element (CE) (MAC-CE) and the second indication is received in a downlink control information.

In a twelfth aspect, alone or in combination with one or more of the first through eleventh aspects, the set of operation power parameters includes at least one of a frequency domain configuration parameter, a time domain configuration parameter, a scheduling configuration parameter, a multiple input multiple output configuration parameter, a discontinuous reception configuration parameter, a processing timeline configuration parameter, a downlink control channel configuration parameter, a wakeup signal configuration parameter, a radio resource management configuration parameter, or a combination thereof. In a thirteenth aspect, alone or in combination with one or more of the first through twelfth aspects, the set of parameters includes a parameter that indicates whether the UE is to process or report measurements of channel state information reference signals (CSI-RS) regardless of whether periodic CSI-RS are configured for the UE. In a fourteenth aspect, alone or in combination with one or more of the first through thirteenth aspects, at least one of the first indication or the second indication is outside of an active time of the UE and the at least one of the first indication or the second indication is a physical downlink control channel wake up signal downlink control information (DCI). In a fifteenth aspect, alone or in combination with one or more of the first through fourteenth aspects, at least one of the first indication or the second indication is during an active period or an awake period of the UE and the at least one of the first indication or the second indication is a downlink control information (DCI) format 0-1 or DCI format 1-1.

At 520, the UE may configure the UE to operate using a power configuration based at least in part on a set of values for the set of operation power parameters. For example, the UE (e.g., using antenna 252, MOD/DEMOD 254, MIMO detector 256, receive processor 258, transmit processor 264, TX MIMO processor 266, controller/processor 280, and/or the like) may configure the UE to operate using a power configuration, of a plurality of power configurations, based at least in part on the set of values for the set of operation power parameters, as described above.

At 530, in some aspects, the UE may communicate with a base station based at least in part on the power configuration. For example, the UE (e.g., using antenna 252, MOD/DEMOD 254, MIMO detector 256, receive processor 258, transmit processor 264, TX MIMO processor 266, controller/processor 280, and/or the like) may communicate with a base station based at least in part on the power configuration. In a sixteenth aspect, alone or in combination with one or more of the first through fifteenth aspects, the UE may communicate with the base station using a low power consumption setting. In some aspects, the UE may communicate with the base station using a high throughput setting.

Method 500 may include additional aspects, such as any single aspect or any combination of aspects described in connection with one or more other processes described elsewhere herein.

Although FIG. 5 shows example blocks of a method 500 of wireless communication, in some aspects, the method 500 may include additional blocks, fewer blocks, different blocks, or differently arranged blocks than those shown in FIG. 5. Additionally, or alternatively, two or more blocks shown in FIG. 5 may be performed in parallel.

Figure 6:
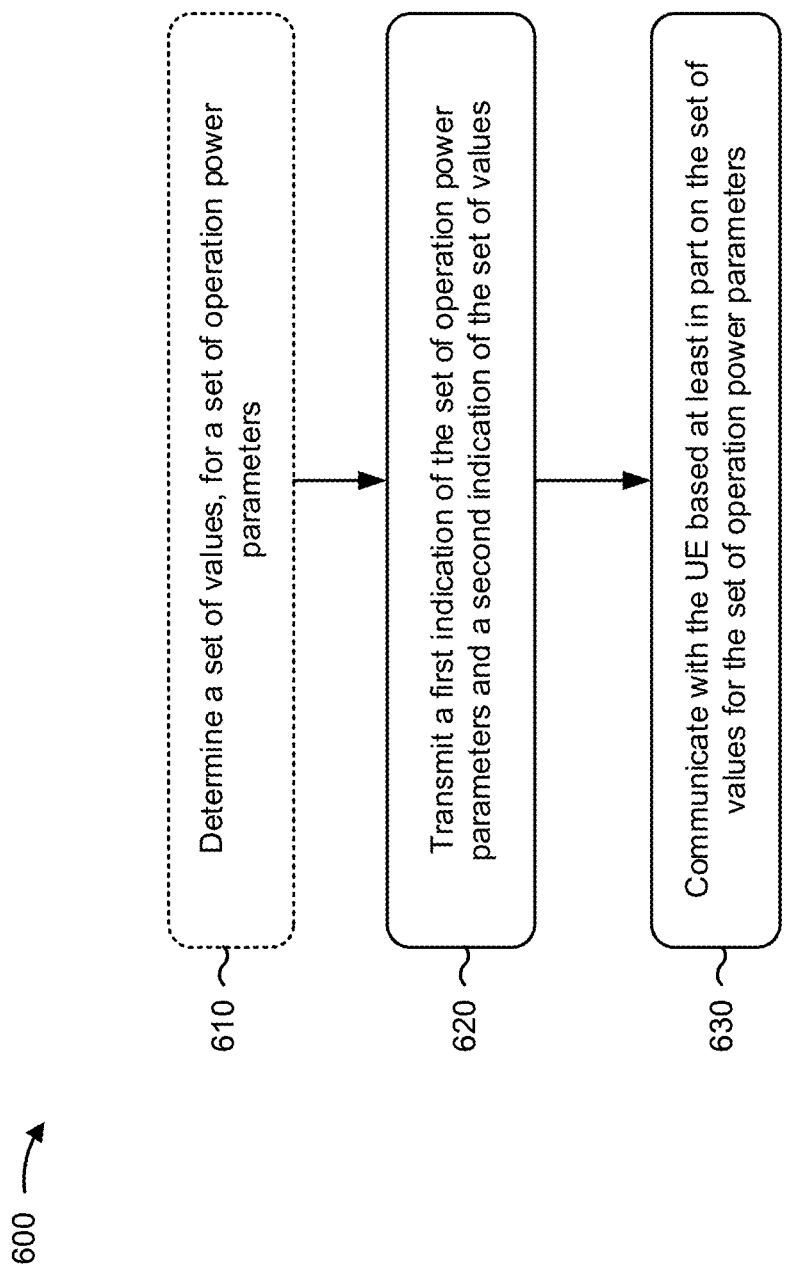
FIG. 6 is a flow chart of another method of wireless communication.

FIG. 6 is a flow chart of a method 600 of wireless communication. The method may be performed by a base station (e.g., the base station 110, the apparatus 902/902', and/or the like).

At 610, in some aspects, the base station may determine a set of values for a set of operation power parameters. For example, the base station (e.g., using controller/processor 240 and/or the like) may determine a set of values for a set of operation power parameters, which may, collectively, define a power configuration for a UE, as described above. In a first aspect, the set of values may be for a set of operation power parameters that are configurable to achieve the power configuration. In a second aspect, alone or in combination with the first aspect, at least one of the set of parameters or the set of values are determined based at least in part on a UE capability, a device type of the UE, a determination of whether there is data available for the UE, a determination of a volume of network traffic associated with the UE, or a combination thereof.

At 620, the base station may transmit a first indication of the set of operation power parameters and a second indication of the set of values. For example, the base station (e.g., using controller/processor 240, transmit processor 220, TX MIMO processor 230, MOD 232, antenna 234, and/or the like) may transmit a first indication of a set of operation power parameters from a plurality of sets of operation power parameters and a second indication of a set of values for the set of operation power parameters, as described above. In a third aspect, alone or in combination with one or more of the first and second aspects, the first indication and/or the second indication may be transmitted in at least one of DCI or a MAC-CE. In a fourth aspect, alone or in combination with one or more of the first through third aspects, different sets of values correspond to different power configurations of the UE.

In a fifth aspect, alone or in combination with one or more of the first through fourth aspects, the first indication is one of a plurality of indications corresponding to the plurality of sets of operation power parameters, and wherein a relationship between the plurality of indications and the plurality of sets of operation power parameters is predetermined or transmitted by the base station in a radio resource control (RRC) message. In a sixth aspect, alone or in combination with one or more of the first through fifth aspects, the set of operation power parameters includes a list of operation power parameters. In a seventh aspect, alone or in combination with one or more of the first through sixth aspects, the set of values is included in at least one of downlink control information (DCI) or a media access control (MAC) control element (CE) (MAC-CE). In an eighth aspect, alone or in combination with one or more of the first through seventh aspects, the set of values is indicated using a value vector index included in the DCI or the MAC-CE, wherein the value vector index corresponds to the set of values.

In a ninth aspect, alone or in combination with one or more of the first through eighth aspects, the value vector index is one of a plurality of value vector indexes, and wherein each value vector index, of the plurality of value vector indexes, corresponds to a different set of values of a plurality of sets of values. In a tenth aspect, alone or in combination with one or more of the first through ninth aspects, a relationship between the plurality of value vector indexes and the plurality of sets of values is predetermined or transmitted by the base station in a radio resource control (RRC) message. In an eleventh aspect, alone or in combination with one or more of the first through tenth aspects, one set of operation power parameters, of the plurality of sets of operation power parameters, includes all operation power parameters included in all other sets of operation power parameters of the plurality of sets of operation power parameters. In a thirteenth aspect, alone or in combination with one or more of the first through twelfth aspects, the first indication and the second indication are transmitted in a downlink control information (DCI).

At 630, the base station may communicate with the UE based at least in part on the set of values for the set of operation power parameters. For example, the base station (e.g., using transmit processor 220, TX MIMO processor 230, MOD/DEMOD 232, antenna 234, MIMO detector 236, receive processor 238, controller/processor 240, and/or the like) may communicate with the UE in accordance with a power configuration, of a plurality of power configurations, configured based at least in part on the set of values for the set of operation power parameters, as described above. In some aspects, each power configuration, of the plurality of power configurations, is defined by a corresponding set of operation power parameters, of the plurality of sets of operation power parameters, with a corresponding set of values. In a fourteenth aspect, alone or in combination with one or more of the first through thirteenth aspects, the set of parameters includes at least one of a frequency domain configuration parameter, a time domain configuration parameter, a scheduling configuration parameter, a multiple input multiple output configuration parameter, a discontinuous reception configuration parameter, a processing timeline configuration parameter, a downlink control channel configuration parameter, a wakeup signal configuration parameter, a radio resource management configuration parameter, or a combination thereof.

Method 600 may include additional aspects, such as any single aspect or any combination of aspects described in connection with one or more other processes described elsewhere herein.

Although FIG. 6 shows example blocks of a method 600 of wireless communication, in some aspects, the method 600 may include additional blocks, fewer blocks, different blocks, or differently arranged blocks than those shown in FIG. 6. Additionally, or alternatively, two or more blocks shown in FIG. 6 may be performed in parallel.

Figure 7:
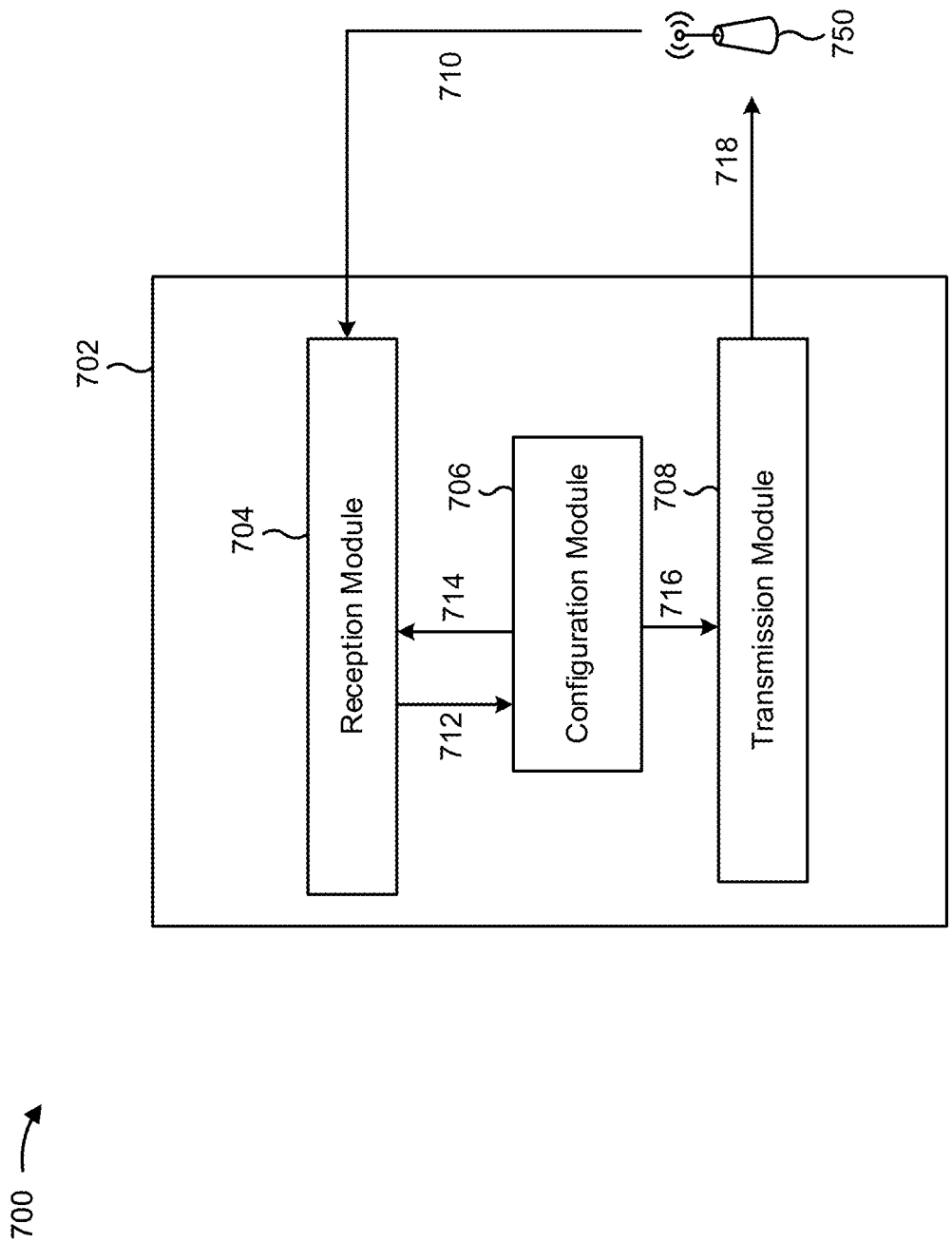
FIG. 7 is a conceptual data flow diagram illustrating the data flow between different modules/means/components in an example apparatus.

FIG. 7 is a conceptual data flow diagram 700 illustrating the data flow between different modules/means/components in an example apparatus 702. The apparatus 702 may be a UE. In some aspects, the apparatus 702 includes a reception module 704, a configuration module 706, a transmission module 708, and/or the like.

The reception module 704 may receive, from an apparatus 750 (e.g., a base station 110) as information 710, a first indication of a set of operation power parameters from a plurality of sets of operation power parameters and a second indication of a set of values corresponding to the set of operation power parameters. In some aspects, the information 710 may be received in DCI, a MAC-CE, or a combination thereof. The reception module 704 may provide the first indication and/or the second indication (and/or information that identifies the set of operation power parameters and/or the set of values) to the configuration module 706 as information 712. The configuration module 706 may use the information 712 to determine the set of operation power parameters and/or the set of values, and/or may use the information 712 to configure the apparatus 702 to operate using a power configuration indicated by the set of values for the set of operation power parameters. For example, the configuration module 706 may configure the reception module 704 using information 714, may configure the transmission module 708 using information 716, and/or may configure one or more other components and/or modules of the apparatus 702 (e.g., one or more components of UE 120 described above in connection with FIG. 2). The apparatus 702 may communicate with the apparatus 750 based at least in part on the configuration (e.g., to receive further information 710 and/or to transmit information 718).

The apparatus may include additional modules that perform each of the blocks of the algorithm in the aforementioned method 500 of FIG. 5 and/or the like. Each block in the aforementioned method 500 of FIG. 5 may be performed by a module, and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 7 are provided as an example. In practice, there may be additional modules, fewer modules, different modules, or differently arranged modules than those shown in FIG. 7. Furthermore, two or more modules shown in FIG. 7 may be implemented within a single module, or a single module shown in FIG. 7 may be implemented as multiple, distributed modules. Additionally, or alternatively, a set of modules (e.g., one or more modules) shown in FIG. 7 may perform one or more functions described as being performed by another set of modules shown in FIG. 7.

Figure 8:
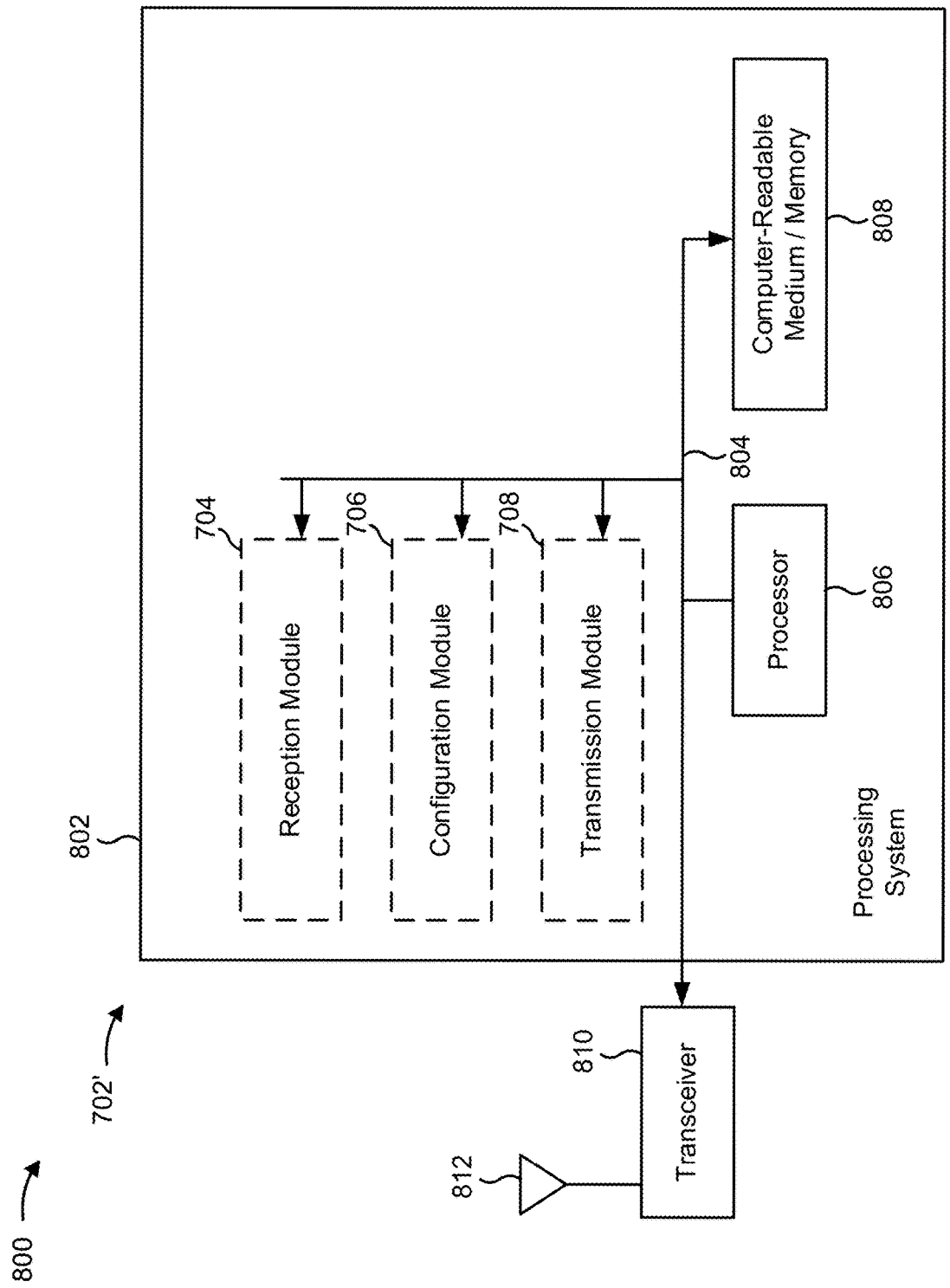
FIG. 8 is a diagram illustrating an example of a hardware implementation for an apparatus employing a processing system.

FIG. 8 is a diagram 800 illustrating an example of a hardware implementation for an apparatus 702' employing a processing system 802. The apparatus 702' may be a UE.

The processing system 802 may be implemented with a bus architecture, represented generally by the bus 804. The bus 804 may include any number of interconnecting buses and bridges depending on the specific application of the processing system 802 and the overall design constraints. The bus 804 links together various circuits including one or more processors and/or hardware modules, represented by the processor 806, the modules 704, 706, and/or 708, and the computer-readable medium/memory 808. The bus 804 may also link various other circuits such as timing sources, peripherals, voltage regulators, and power management circuits, which are well known in the art, and therefore will not be described any further.

The processing system 802 may be coupled to a transceiver 810. The transceiver 810 is coupled to one or more antennas 812. The transceiver 810 provides a means for communicating with various other apparatuses over a transmission medium. The transceiver 810 receives a signal from the one or more antennas 812, extracts information from the received signal, and provides the extracted information to the processing system 802, specifically the reception module 704. In addition, the transceiver 810 receives information from the processing system 802, specifically the transmission module 708, and based at least in part on the received information, generates a signal to be applied to the one or more antennas 812. The processing system 802 includes a processor 806 coupled to a computer-readable medium/memory 808. The processor 806 is responsible for general processing, including the execution of software stored on the computer-readable medium/memory 808. The software, when executed by the processor 806, causes the processing system 802 to perform the various functions described herein for any particular apparatus. The computer-readable medium/memory 808 may also be used for storing data that is manipulated by the processor 806 when executing software. The processing system further includes at least one of the modules 704, 706, and/or 708. The modules may be software modules running in the processor 806, resident/stored in the computer readable medium/memory 808, one or more hardware modules coupled to the processor 806, or some combination thereof. The processing system 802 may be a component of the UE 120 and may include the memory 282 and/or at least one of the TX MIMO processor 266, the RX processor 258, and/or the controller/processor 280.

In some aspects, the apparatus 702/702' for wireless communication includes means for receiving a first indication of a set of operation power parameters from a plurality of sets of operation power parameters and a second indication of a set of values for the set of operation power parameters; means for configuring the UE to operate using a power configuration, of a plurality of power configurations, based at least in part on the set of values for the set of operation power parameters, wherein each power configuration, of the plurality of power configurations, is defined by a corresponding set of operation power parameters, of the plurality of sets of operation power parameters, with a corresponding set of values; and/or the like. The aforementioned means may be one or more of the aforementioned modules of the apparatus 702 and/or the processing system 802 of the apparatus 702' configured to perform the functions recited by the aforementioned means. As described elsewhere herein, the processing system 802 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions recited by the aforementioned means.

FIG. 8 is provided as an example. Other examples may differ from what is described in connection with FIG. 8.

Figure 9:
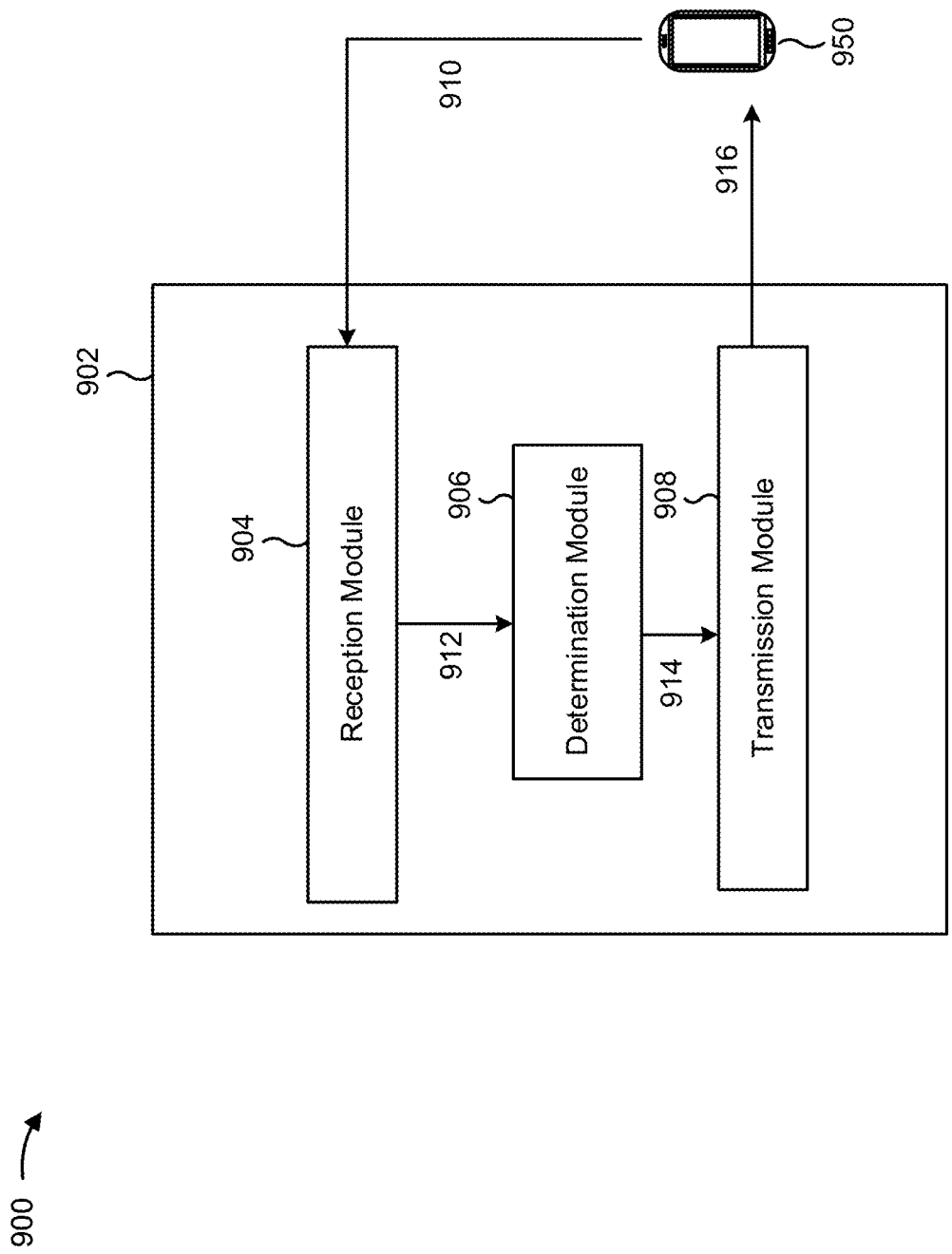
FIG. 9 is a conceptual data flow diagram illustrating the data flow between different modules/means/components in another example apparatus.

FIG. 9 is a conceptual data flow diagram 900 illustrating the data flow between different modules/means/components in an example apparatus 902. The apparatus 902 may be a base station. In some aspects, the apparatus 902 includes a reception module 904, a determination module 906, a transmission module 908, and/or the like.

The determination module 906 may determine a set of values, for a set of operation power parameters, corresponding to a power configuration to be configured for an apparatus 950 (e.g., a UE 120). In some aspects, the reception module 904 may receive information 910 from the apparatus 950 (e.g., a capability report and/or the like) and may provide such information to the determination module 906 as information 912. The determination module 906 may use such information 912 to determine the set of operation power parameters and/or the set of values. The determination module may provide information regarding the set of operation power parameters and/or the set of values to the transmission module 908 as information 914. The transmission module 908 may transmit, to the apparatus 950 as information 916, a first indication of the set of operation power parameters and a second indication of the set of values corresponding to the set of operation power parameters. In some aspects, the information 916 may be transmitted in DCI, a MAC-CE, or a combination thereof. The apparatus 902 may communicate with the apparatus 950

(e.g., by receiving further information 910 or transmitting further information 916) based at least in part on the set of values and the set of operation power parameters.

The apparatus may include additional modules that perform each of the blocks of the algorithm in the aforementioned method 600 of FIG. 6 and/or the like. Each block in the aforementioned method 600 of FIG. 6 and/or the like may be performed by a module, and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 9 are provided as an example. In practice, there may be additional modules, fewer modules, different modules, or differently arranged modules than those shown in FIG. 9. Furthermore, two or more modules shown in FIG. 9 may be implemented within a single module, or a single module shown in FIG. 9 may be implemented as multiple, distributed modules. Additionally, or alternatively, a set of modules (e.g., one or more modules) shown in FIG. 9 may perform one or more functions described as being performed by another set of modules shown in FIG. 9.

Figure 10:
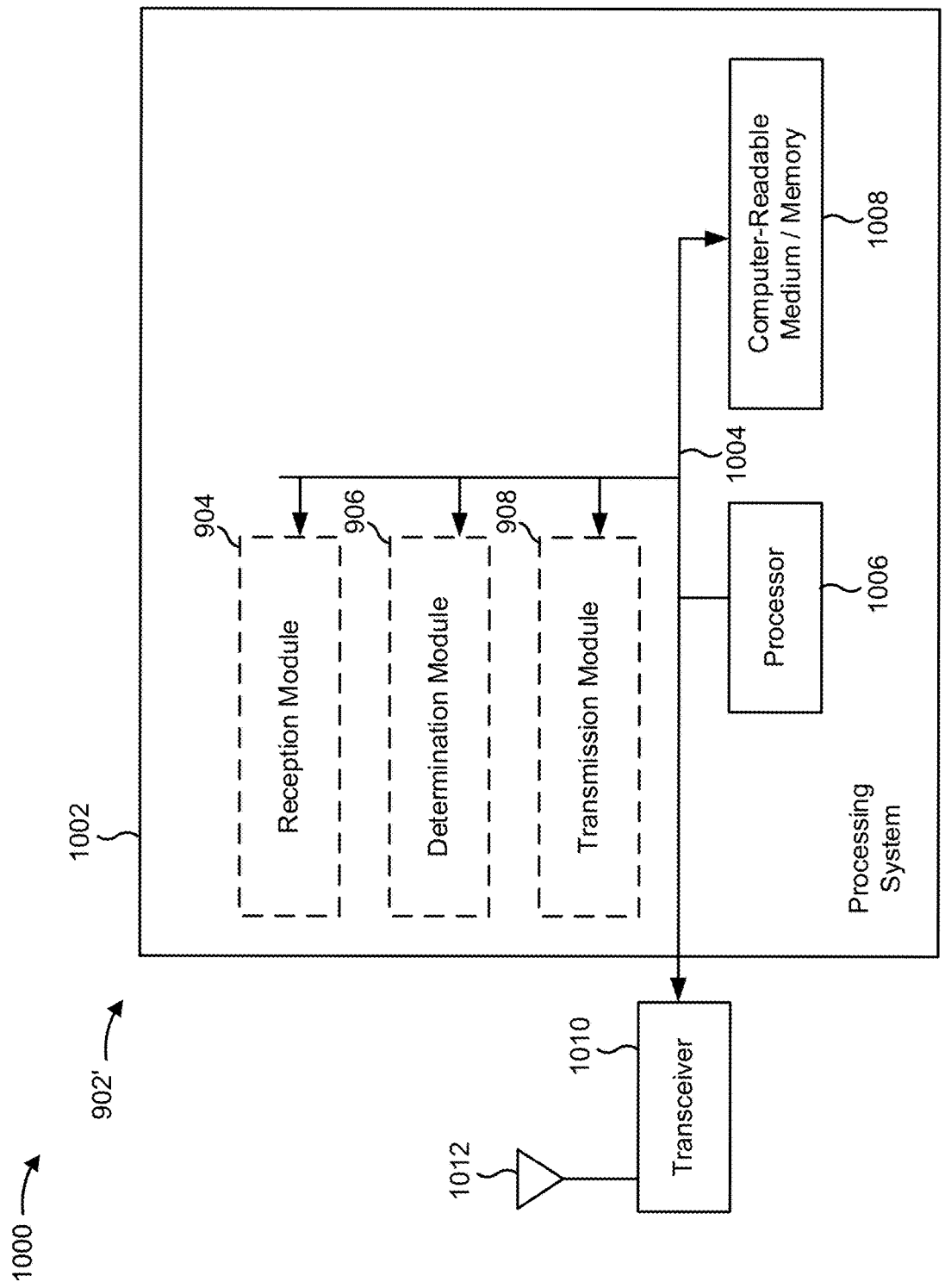
FIG. 10 is a diagram illustrating another example of a hardware implementation for an apparatus employing a processing system.

FIG. 10 is a diagram 1000 illustrating an example of a hardware implementation for an apparatus 902' employing a processing system 1002. The apparatus 902' may be a base station.

The processing system 1002 may be implemented with a bus architecture, represented generally by the bus 1004. The bus 1004 may include any number of interconnecting buses and bridges depending on the specific application of the processing system 1002 and the overall design constraints. The bus 1004 links together various circuits including one or more processors and/or hardware modules, represented by the processor 1006, the modules 904, 906, and/or 908, and the computer-readable medium/memory 1008. The bus 1004 may also link various other circuits such as timing sources, peripherals, voltage regulators, and power management circuits, which are well known in the art, and therefore will not be described any further.

The processing system 1002 may be coupled to a transceiver 1010. The transceiver 1010 is coupled to one or more antennas 1012. The transceiver 1010 provides a means for communicating with various other apparatus over a transmission medium. The transceiver 1010 receives a signal from the one or more antennas 1012, extracts information from the received signal, and provides the extracted information to the processing system 1002, specifically the reception module 904. In addition, the transceiver 1010 receives information from the processing system 1002, specifically the transmission module 908, and based at least in part on the received information, generates a signal to be applied to the one or more antennas 1012. The processing system 1002 includes a processor 1006 coupled to a computer-readable medium/memory 1008. The processor 1006 is responsible for general processing, including the execution of software stored on the computer-readable medium/memory 1008. The software, when executed by the processor 1006, causes the processing system 1002 to perform the various functions described herein for any particular apparatus. The computer-readable medium/memory 1008 may also be used for storing data that is manipulated by the processor 1006 when executing software. The processing system further includes at least one of the modules 904, 906, and/or 908. The modules may be software modules running in the processor 1006, resident/stored in the computer readable medium/memory 1008, one or more hardware modules coupled to the processor 1006, or some combination thereof. The processing system 1002 may be a component of the base station 110 and may include the memory 242 and/or at least one of the TX MIMO processor 230, the RX processor 238, and/or the controller/processor 240.

In some aspects, the apparatus 902/902' for wireless communication includes means for transmitting, to a user equipment (UE), a first indication of a set of operation power parameters from a plurality of sets of operation power parameters and a second indication of a set of values for the set of operation power parameters; means for communicating with the UE in accordance with a power configuration, of a plurality of power configurations, configured based at least in part on the set of values for the set of operation power parameters, wherein each power configuration, of the plurality of power configurations, is defined by a corresponding set of operation power parameters, of the plurality of sets of operation power parameters, with a corresponding set of values; and/or the like. The aforementioned means may be one or more of the aforementioned modules of the apparatus 902 and/or the processing system 1002 of the apparatus 902' configured to perform the functions recited by the aforementioned means. As described elsewhere herein, the processing system 1002 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform the functions recited by the aforementioned means.

FIG. 10 is provided as an example. Other examples may differ from what is described in connection with FIG. 10.

It should be understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
   receiving a value vector index of a plurality of value vector indexes,
      wherein each different value vector index corresponds to a different set of values for a set of operation power parameters; and
   configuring the UE to operate using a set of values for the set of operation power parameters that corresponds to the value vector index,
      wherein the set of operation power parameters includes:
         a first parameter that indicates a minimum timing offset between a downlink grant and corresponding downlink data transmission, and
         a second parameter that indicates a minimum timing offset between an uplink grant and a corresponding uplink data transmission, and
      wherein the value vector index corresponds to both:
         a first value for the first parameter that indicates the minimum timing offset between the downlink grant and corresponding downlink data transmission; and
         a second value for the second parameter that indicates the minimum timing offset between the uplink grant and a corresponding uplink data transmission.

2. The method of claim 1, wherein the value vector index is included in at least one of downlink control information (DCI) or a media access control (MAC) control element (CE) (MAC-CE).

3. The method of claim 1, wherein a relationship between the plurality of value vector indexes and a plurality of sets of values, including the set of values, is predetermined.

4. The method of claim 1, wherein the value vector index is received in a downlink control information (DCI).

5. The method of claim 4, wherein the DCI is at least one of:
   a DCI format 0-1, or
   a DCI format 1-1.

6. The method of claim 1, wherein the value vector index is received in a medium access control (MAC) control element (CE) (MAC-CE).

7. The method of claim 1, wherein the set of operation power parameters further includes at least one of:
   a frequency domain configuration parameter,
   a time domain configuration parameter,
   a scheduling configuration parameter,
   a multiple input multiple output configuration parameter,
   a downlink control channel configuration parameter,
   a wakeup signal configuration parameter,
   a radio resource management configuration parameter, or
   a combination thereof.

8. The method of claim 1, wherein the set of operation parameters are indicated in a radio resource control (RRC) message.

9. The method of claim 1, wherein the set of values is indicated in a radio resource control (RRC) message and the value vector index is included in downlink control information (DCI).

10. The method of claim 1, wherein the set of operation power parameters includes a third parameter indicating a minimum timing offset between downlink control information (DCI) and aperiodic channel state information reference signals (CSI-RS),
    wherein the value vector index corresponds to a third value for the third parameter that indicates the minimum timing offset between DCI and aperiodic CSI-RS.

11. A method of wireless communication performed by a base station, comprising:
    transmitting a value vector index of a plurality of value vector indexes,
       wherein each different value vector index corresponds to a different set of values for a set of operation power parameters; and
    communicating with a user equipment (UE) in accordance with a power configuration configured based at least in part on a set of values for the set of operation power parameters that corresponds to the value vector index,
       wherein the set of operation power parameters includes:
          a first parameter that indicates a minimum timing offset between a downlink grant and corresponding downlink data transmission, and
          a second parameter that indicates a minimum timing offset between an uplink grant and a corresponding uplink data transmission, and
       wherein the value vector index corresponds to both:
          a first value for the first parameter that indicates the minimum timing offset between the downlink grant and corresponding downlink data transmission; and
          a second value for the second parameter that indicates the minimum timing offset between the uplink grant and a corresponding uplink data transmission.

12. The method of claim 11, wherein the value vector index is included in at least one of downlink control information (DCI) or a media access control (MAC) control element (CE) (MAC-CE).

13. The method of claim 11, wherein a relationship between the plurality of value vector indexes and a plurality of sets of values, including the set of values, is predetermined.

14. The method of claim 11, wherein the value vector index is transmitted in a downlink control information (DCI).

15. The method of claim 14, wherein the DCI is at least one of:
    a DCI format 0-1, or
    a DCI format 1-1.

16. The method of claim 11, wherein the value vector index is received in a medium access control (MAC) control element (CE) (MAC-CE).

17. The method of claim 11, wherein the set of operation power parameters further includes at least one of:
    a frequency domain configuration parameter,
    a time domain configuration parameter,
    a scheduling configuration parameter,
    a multiple input multiple output configuration parameter,
    a downlink control channel configuration parameter,
    a wakeup signal configuration parameter,
    a radio resource management configuration parameter, or
    a combination thereof.

18. The method of claim 11, wherein the set of operation parameters are indicated in a radio resource control (RRC) message.

19. The method of claim 11, wherein the set of values is indicated in a radio resource control (RRC) message and the value vector index is included in downlink control information (DCI).

20. The method of claim 11, wherein the set of operation power parameters includes a third parameter indicating a minimum timing offset between downlink control information (DCI) and aperiodic channel state information reference signals (CSI-RS), wherein the value vector index corresponds to a third value for the third parameter that indicates the minimum timing offset between DCI and aperiodic CSI-RS.

21. A user equipment (UE) for wireless communication, comprising:
   a memory; and
   one or more processors operatively coupled to the memory, the memory and the one or more processors configured to:
      receive a value vector index of a plurality of value vector indexes,
         wherein each different value vector index corresponds to a different set of values for a set of operation power parameters; and
      configure the UE to operate using a set of values for the set of operation power parameters that corresponds to the value vector index,
         wherein the set of operation power parameters includes:
            a first parameter that indicates a minimum timing offset between a downlink grant and corresponding downlink data transmission, and
            a second parameter that indicates a minimum timing offset between an uplink grant and a corresponding uplink data transmission, and
         wherein the value vector index corresponds to both:
            a first value for the first parameter that indicates the minimum timing offset between the downlink grant and corresponding downlink data transmission; and
            a second value for the second parameter that indicates the minimum timing offset between the uplink grant and a corresponding uplink data transmission.

22. The UE of claim 21, wherein a relationship between the plurality of value vector indexes and a plurality of sets of values, including the set of values, is predetermined.

23. The UE of claim 21, wherein the set of operation parameters are indicated in a radio resource control (RRC) message.

24. The UE of claim 21, wherein the set of values is indicated in a radio resource control (RRC) message and the value vector index is included in downlink control information (DCI).

25. The UE of claim 21, wherein the set of operation power parameters includes a third parameter indicating a minimum timing offset between downlink control information (DCI) and aperiodic channel state information reference signals (CSI-RS),
   wherein the value vector index corresponds to a third value for the third parameter that indicates the minimum timing offset between DCI and aperiodic CSI-RS.

26. A non-transitory computer-readable medium storing one or more instructions for wireless communication, the one or more instructions comprising:
   one or more instructions executable by one or more processors of a user equipment (UE) that cause the one or more processors to:
      receive a value vector index of a plurality of value vector indexes,
         wherein each different value vector index corresponds to a different set of values for a set of operation power parameters; and
      configure the UE to operate using a set of values for the set of operation power parameters that corresponds to the value vector index,
         wherein the set of operation power parameters includes:
            a first parameter that indicates a minimum timing offset between a downlink grant and corresponding downlink data transmission, and
            a second parameter that indicates a minimum timing offset between an uplink grant and a corresponding uplink data transmission, and
         wherein the value vector index corresponds to both:
            a first value for the first parameter that indicates the minimum timing offset between the downlink grant and corresponding downlink data transmission; and
            a second value for the second parameter that indicates the minimum timing offset between the uplink grant and a corresponding uplink data transmission.

27. The non-transitory computer-readable medium of claim 26, wherein a relationship between the plurality of value vector indexes and a plurality of sets of values, including the set of values, is predetermined.

28. The non-transitory computer-readable medium of claim 26, wherein the set of operation parameters are indicated in a radio resource control (RRC) message.

29. The non-transitory computer-readable medium of claim 26, wherein the set of values is indicated in a radio resource control (RRC) message and the value vector index is included in downlink control information (DCI).

30. The non-transitory computer-readable medium of claim 26, wherein the set of operation power parameters includes a third parameter indicating a minimum timing offset between downlink control information (DCI) and aperiodic channel state information reference signals (CSI-RS),
   wherein the value vector index corresponds to a third value for the third parameter that indicates the minimum timing offset between DCI and aperiodic CSI-RS.

* * * * *